United States Patent [19]
DeCoster et al.

[11] Patent Number: 5,850,923
[45] Date of Patent: Dec. 22, 1998

[54] FLOUR SIFTER

[75] Inventors: Pieter K. J. DeCoster; Dimitri M. C. J. Backaert, both of Aalst, Belgium

[73] Assignee: Dart Industries Inc., Orlando, Fla.

[21] Appl. No.: 705,933

[22] Filed: Aug. 30, 1996

[51] Int. Cl.[6] ............................. B07B 1/49; B07B 1/24; B07B 1/32
[52] U.S. Cl. ....................... 209/417; 209/357; 209/365.2; 209/373; 209/387
[58] Field of Search .................................. 209/417, 352, 209/357, 358, 365.2, 385, 387, 389, 372, 373, 374

[56] References Cited

U.S. PATENT DOCUMENTS

| 379,499 | 3/1888 | Andrews . | |
|---|---|---|---|
| D. 390,069 | 2/1998 | DeCoster | D7/668 |
| 524,892 | 8/1894 | Eichler . | |
| 809,178 | 1/1906 | Farmer | 209/357 |
| 1,005,991 | 10/1911 | McEachron | 209/357 |
| 1,136,243 | 4/1915 | Lawlor | 209/357 |
| 1,482,873 | 2/1924 | Ullrich | 209/372 |
| 1,610,300 | 12/1926 | Lovejoy | 209/352 |
| 1,955,847 | 4/1934 | Dickey | 209/357 |
| 2,244,186 | 6/1941 | Braun . | |
| 2,278,729 | 4/1942 | Merrill | 209/357 |
| 2,314,186 | 3/1943 | Zuck . | |
| 2,416,810 | 2/1947 | Bailey . | |
| 2,592,850 | 4/1952 | Barbery | 209/357 |
| 2,607,491 | 8/1952 | Dennis . | |
| 3,415,376 | 12/1968 | Smith et al. . | |
| 4,136,022 | 1/1979 | Hutlzer et al. . | |
| 4,325,822 | 4/1982 | Miller | 209/374 |
| 4,534,858 | 8/1985 | Aldizich et al. . | |
| 5,458,246 | 10/1995 | Thom | 209/389 |

FOREIGN PATENT DOCUMENTS

| 516620 | 9/1955 | Canada | 209/357 |
|---|---|---|---|
| 0 310 009 A | 4/1989 | European Pat. Off. . | |
| 1020517 | 12/1957 | Germany . | |
| 33 40 412 A | 5/1985 | Germany . | |
| 8804217 U | 7/1988 | Germany . | |
| 430048 | 6/1935 | United Kingdom . | |

*Primary Examiner*—William E. Terrell
*Assistant Examiner*—Joe Dillon, Jr.
*Attorney, Agent, or Firm*—John A. Doninger; Taylor J. Ross

[57] ABSTRACT

A manual sifter including a rotor overlying a sifter screen and rotatable in response to longitudinal reciprocation of a drive arm engaging a crank wheel fixed to the rotor. The drive arm includes a projecting pin engaged within an elongated slot of the crank wheel, the drive arm having a cam edge thereon engage with the crank wheel to vary the torque applied to the rotation of the crank wheel as the arm reciprocates.

7 Claims, 4 Drawing Sheets

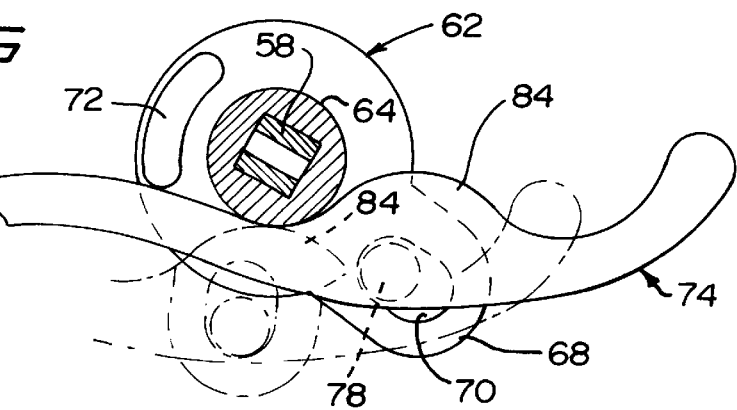
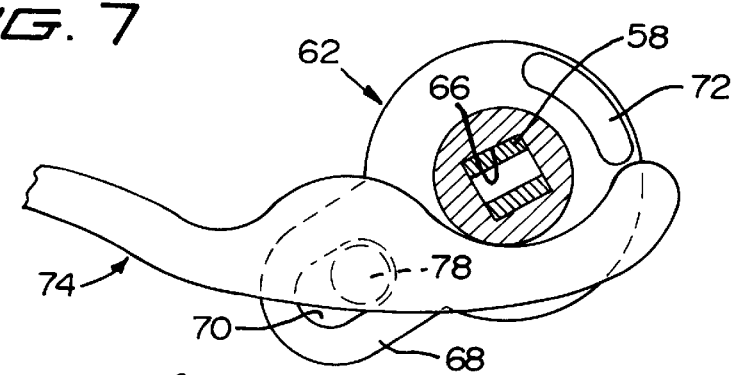
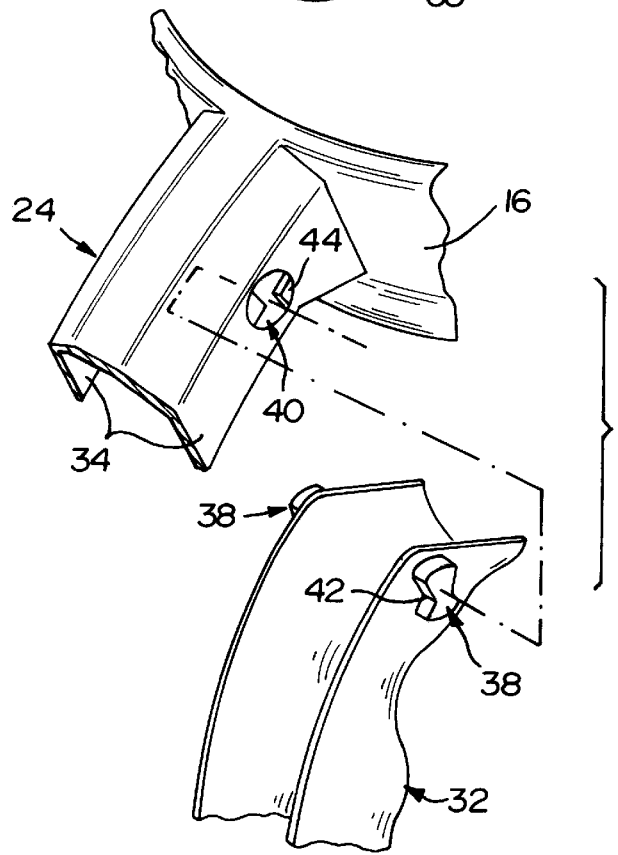

FLOUR SIFTER

BACKGROUND OF THE INVENTION

Sifters for flour and like pulverulent foodstuffs, particularly sifters of the type intended to be held and manipulated by one hand, commonly include a container body with a sifter screen bottom, agitator means above the screen, land a handle assembly for holding the sifter and manipulating the agitator.

Sifters of this type, to be practical, must allow for uninterrupted movement of the agitator mechanism in a manner which is smooth, comfortable and requires minimal effort on the part of the user. This can be difficult to achieve, particularly in the form of sifter wherein reciprocal hand movement is to be translated into oscillating rotatable movement of the agitator.

Consideration must also be given to durability of the sifter and the capability of the operating components thereof to operate freely while subjected to the flour debris as an inherent bi-product of the operation of the sifter.

Another potential difficulty with regard to known sifters arises because of the open nature of the sifter bottom. In other words, there will be a natural tendency for the flour to loosely fall through the bottom of the sifter, even when discharge is not desired as when moving the sifter from one point of use to another, or when temporarily storing the sifter with at least a portion of the contents retained therein.

SUMMARY OF INVENTION

It is intended that the sifter of the present invention incorporate, in a commercially feasible and practical construction, advantages which uniquely improve the sifter, avoiding the shortcomings of known sifters by providing for greater ease of operation and for protection of the product both during use and during periods of nonuse. The relationship between the components of the sifter, both the operating components and the fixed components thereof, provides both efficient and trouble-free operation.

Basically, the sifter of the invention includes a vertically elongate cylinder container with a flared upper end portion terminating in an upwardly directed mouth adapted to receive a closure or seal snap-fitted thereto. The container includes an integral bottom wall in the nature of a sifter screen slightly upwardly offset from the lower edge of the container peripheral wall, thereby defining an underlying chamber with a peripheral wall thereabout. The seal includes an upwardly offset central closed dome portion which can be removably fictionally engaged within the bottom chamber for a selected closing of the sifter bottom to preclude unwanted discharge therethrough should one wish to temporarily retain flour within the sifter. Two such seals can be provided should it be desirable to close both top and bottom of the container body.

The operating components of the sifter include an agitator or rotor with a series of radially projecting blades parallel to and closely overlying the inner face of the screen for agitation and forceable movement of the flour therethrough. The rotor includes a central depending bifurcated lug which snap-locks into an aperture within the upwardly projecting hub of a crank wheel underlying the screen coaxial therewith. The crank wheel in turn includes a radially projecting crank arm with an elongate radial slot therein.

Movement of the rotor is controlled by a hand-gripped trigger pivotally mounted to a handle extending outwardly from one side of the container. The trigger mounts an elongate trigger bar which extends from the trigger and terminates in an elongate drive arm immediately underlying the screen bottom and slidably supported between the screen and the underlying wheel. The drive arm includes a cam edge which, due to the inherent flexible resiliency of the driver arm, is retained against the wheel hub as the drive arm, through action of the trigger, reciprocates relative thereto. The drive arm includes a depending pin which is rotatably received within the elongate slot of the crank arm of the wheel whereby reciprocal movement of the drive arm effects a corresponding rotation of the wheel which in turn is translated into a reciprocating rotational movement of the rotor and blades.

The camming edge of the drive arm includes a central lobe positioned to selectively radially outwardly move the drive arm and pin relative to and within the elongate crank arm slot as the drive arm moves through the section of travel thereof wherein there would normally be a slight resistance or hesitancy in the action of the pin on the crank arm. This resistance, in the repetitive motion required for a continuing sifting operation, could be tiresome and cause some degree of difficulty. The location of the lobe at this area effects a corresponding shifting of the pivot pin which rides in the slot and a corresponding increase of the effective torque arm which has been found to effectively smooth and ease the operation and the effort required for manipulation of the sifter. In other words, at the point of maximum resistance, the torque automatically increases, negating the hesitation or increase in resistance which would normally be felt by the operator of the sifter.

The sifter, in light of the reciprocation thereof required in normal use, will include a trigger return spring as well as end limits.

Other features and advantages of the invention will become apparent from the more detailed description of the invention hereinafter set forth.

BRIEF DESCRIPTION OF THE DRAWINGS

FIG. 6 is a horizontal cross-sectional detail taken substantially on a plane passing along line 6—6 in FIG. 2 and illustrating the drive arm both fully extended with the trigger in its relaxed position, and, in phantom lines, partially retracted;

FIG. 7 is a cross-sectional detail taken substantially on a plane passing along line 7—7 in FIG. 3 with the trigger in its fully retracted position; and FIG. 8 is an enlarged perspective detail illustrating the manner of mounting of the pivoting trigger to the handle.

DESCRIPTION OF PREFERRED EMBODIMENT

Figure 1:
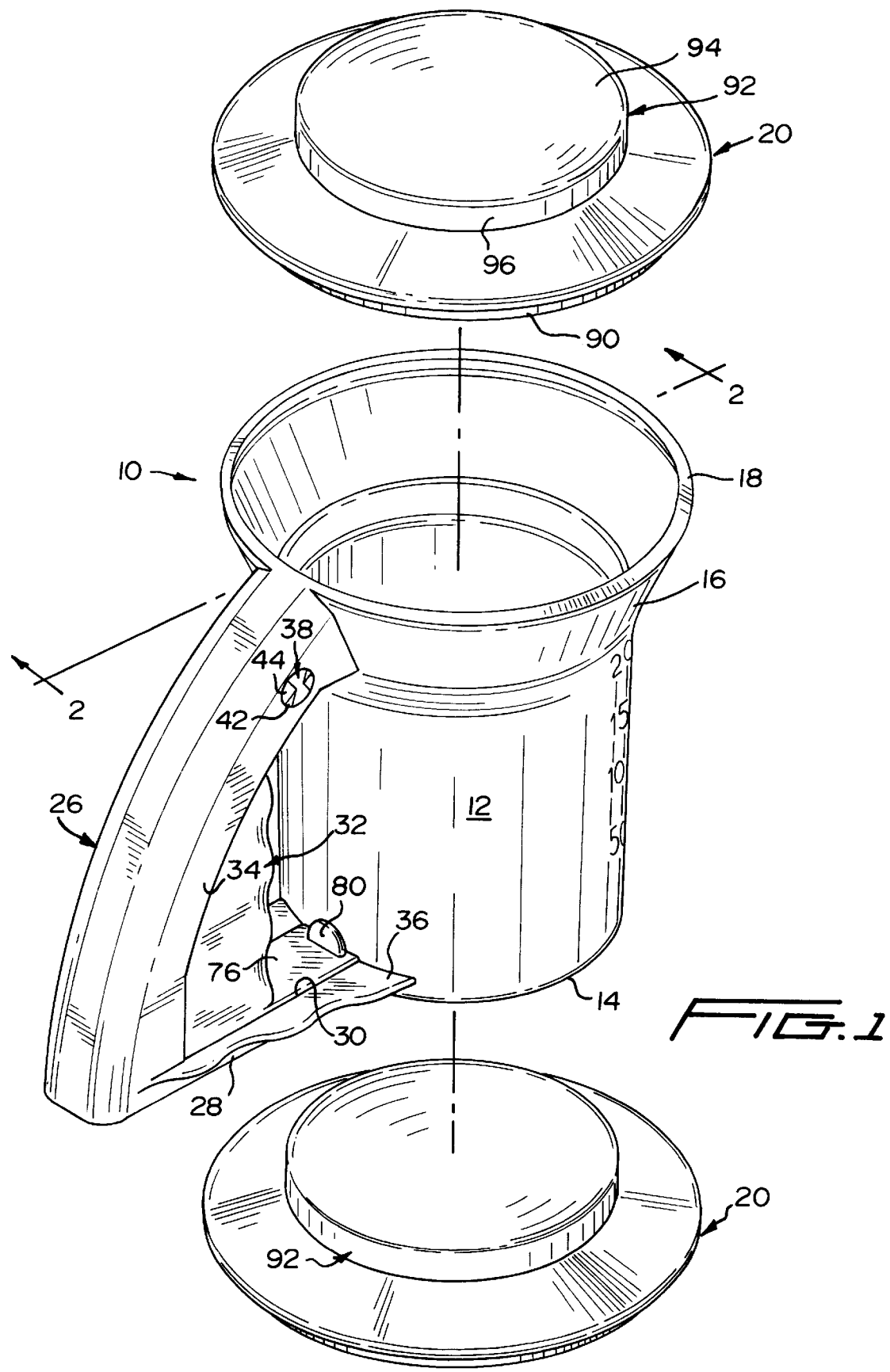
FIG. 1 is a perspective view of the sifter of the invention with both top and bottom seals exploded therefrom.

Referring now more specifically to the drawings, the sifter 10 includes a hollow, vertically elongate, cylindrical body 12, preferably of a constant diameter for the major portion of the height thereof upward from the lower support edge 14. This body 12 comprises the container for the flour or like material to be sifted. In order to facilitate introduction of flour to the sifter body 12, the upper portion 16 thereof outwardly and upwardly flares and terminates in an annular mouth 18 which can be provided with a slight inner lip to which an overlying seal 20 can be releasably engaged as shall be described subsequently.

Figure 4:
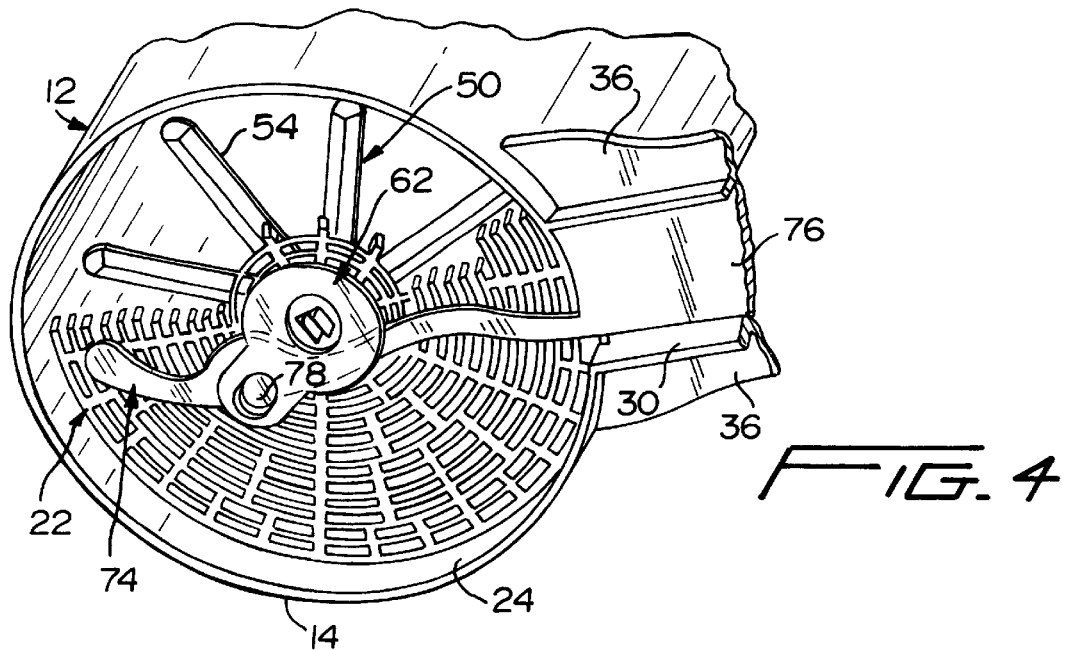
FIG. 4 is a bottom perspective detail of the sifter with portions broken away for purposes of illustration.

The actual sifting of the flour or the like is effected through the sifter screen 22 which forms the bottom or bottom wall of the container body 12 and is integrally formed therewith in slight upwardly spaced relation to the lower support edge 14 to define a chamber 24 immediately below the sifter screen 22 to receive selected ones of the operating components. Noting FIG. 4 in particular wherein a portion of the bottom-forming sifter screen is illustrated in perspective, it will be appreciated that the screen has the multiple openings therein defined by radially spaced concentric arcuate or annular ribs divided into substantially equal length arcuate slots by radially extending ribs of varying lengths, the screen preferably being molded integral with the container body.

The sifter 10 includes a handle 26 rigid and preferably integral, at its upper end, with the inclined portion 16 of the container body 12. The handle arcs outwardly and downwardly from this joined upper end to a lower end outwardly spaced from the lower end of the container 12 and including a common lower edge with the body lower edge 14 to define a wide support base for the sifter. The handle 26 is basically U-shaped in cross-section, opening inwardly toward the container body 12 and has the lower end portion rigidified by opposed extensions 28 which extend between the lower end portion of the handle 26 and the container wall. Such extensions 28 extend parallel to each other to define an operating channel 30 therebetween as a partial guide for the trigger 32 to be described presently. The extensions, which are in fact coplanar inwardly directed continuations of the lower portions of the opposed sides 34 of the U-shaped handle 26, are further rigidified by laterally outwardly directed gusset-type flanges 36 which extend and join to the adjoining portions of the body wall.

The trigger 32, also of a generally U-shaped configuration, is received between the opposed sides 34 of the handle 26 inward relative to the handle for selective pivotal withdraw into the handle and extension outward therefrom. The pivotal mounting of the trigger 32 is effected, noting FIG. 8 in particular, by a pair of opposed laterally projecting stub shafts 38 on the opposed sides of the trigger 32 adjacent the upper end thereof. These shafts 38 are rotatably received within corresponding socket-defining openings 40 in the opposed sides 34 of the handle 26. In order to limit the extent of pivotal movement of the handle 32, the stub shafts 38 include a central waist portion defined by opposed angular notches 42 which receive opposed angular projections 44 extending into the corresponding shaft-receiving sockets 40. The angle of the projections 44 is less than the angle of the corresponding shaft notches 42. As such, rotation of the shafts 38, and hence pivotal movement of the trigger 32, is permitted before the opposed shaft portions, which define the notches, engage the projections 44. This limited movement, which can be approximately 15°, defines the range of movement of the trigger. Note FIG. 1 for a scale illustration of this relationship.

Figure 2:
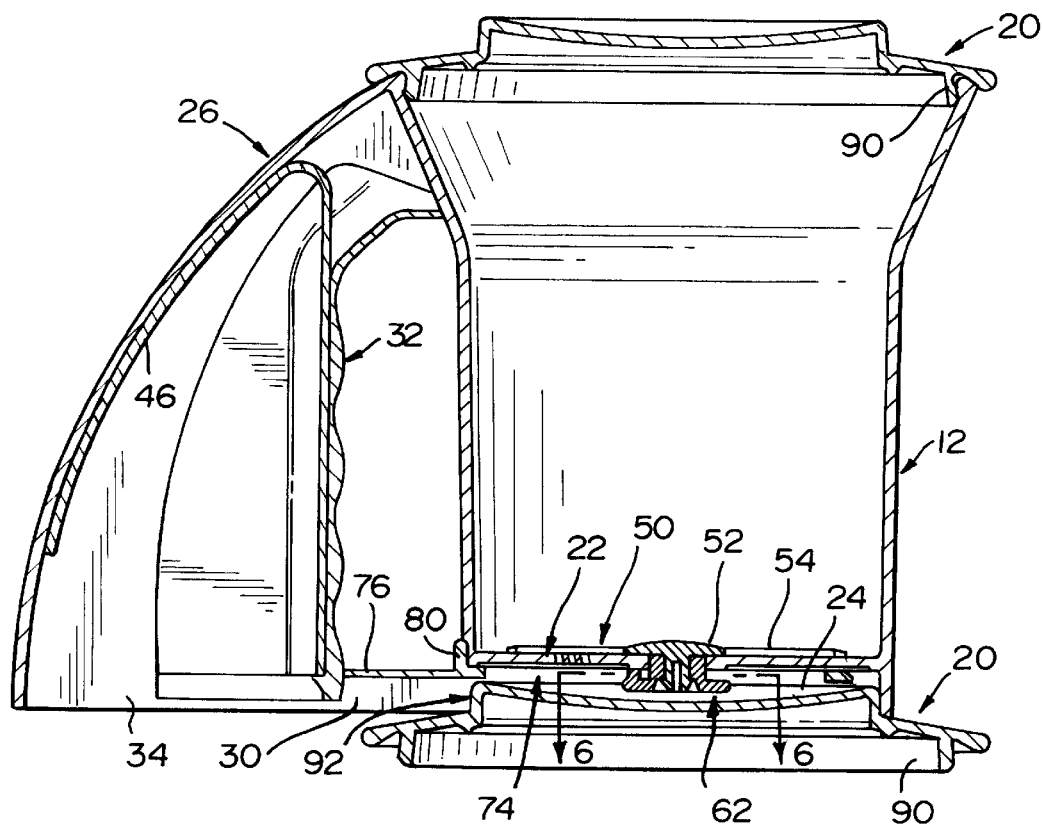
FIG. 2 is a vertical cross-sectional view through the sifter, with both seals mounted, taken substantially on a plane passing along line 2—2 in FIG. 1.
Figure 3:
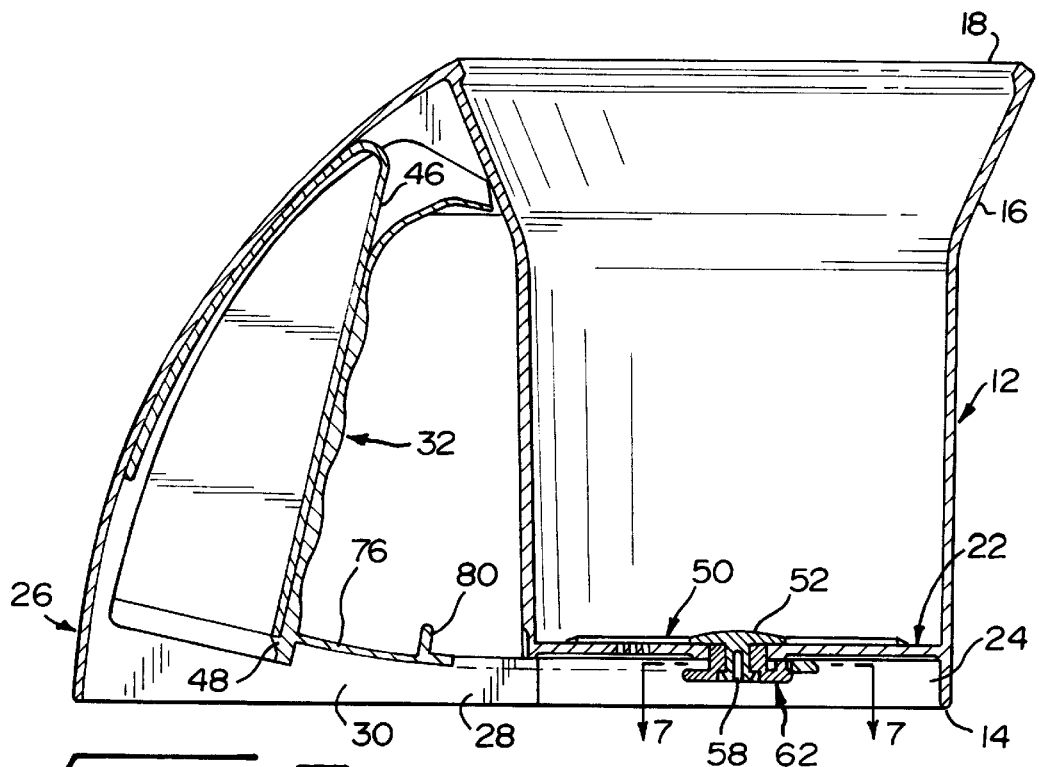
FIG. 3 is a cross-sectional view similar to FIG. 2 with the seals removed and the trigger in its retracted position.

Noting FIGS. 2 and 3, which illustrate the trigger in its fully extended and retracted positions respectively, it will be seen that an appropriate compression spring 46 is received within the opposed facing U-shaped configured handle and trigger, with the opposed legs of the spring engaging respectively against the handle bight portion and the trigger bight portion under slight compression to provide a constant resilient biasing action forcing the trigger to its forward relaxed position, as in FIG. 2. The spring 46 is a return spring which, after manual compression of the trigger 32 toward the handle 26, automatically returns the trigger, generating a reciprocating movement as desired in a sifting operation of the type involved. The illustrated spring 46 can be easily mounted by introduction through the open lower ends of the handle and trigger with the apex of the spring, that portion between the compressible legs thereof, being in general alignment with the stub shafts, and with the lower end of one of the spring legs engaged on a small retaining shoulder 48 at the lower end of the forward wall of the trigger 32. As will be appreciated, other forms of the return springs can be used.

The trigger 32 is intended as a manual means for reciprocally actuating operating components which encourage and enhance movement of the flour or the like through the sifter bottom 22. These components include a rotor 50 having a central hub 52 with integral radially projecting blades 54 extending from the hub, preferably at equally spaced points completely thereabout. The diameter of the rotor 50, to the periphery defined by the outer ends of the blades 54, is slightly less than that of the sifter bottom 22 for an effective sweeping of the blades over the entire usable surface of the bottom during operation as shall be explained subsequently. To enhance the effectiveness of the blades 54 in directing and in some instances forceably moving the flour or the like through the apertures of the sifter bottom, the blades, as suggested in the drawings, may be of a slightly elliptical or oval cross section throughout the length thereof.

Figure 5:
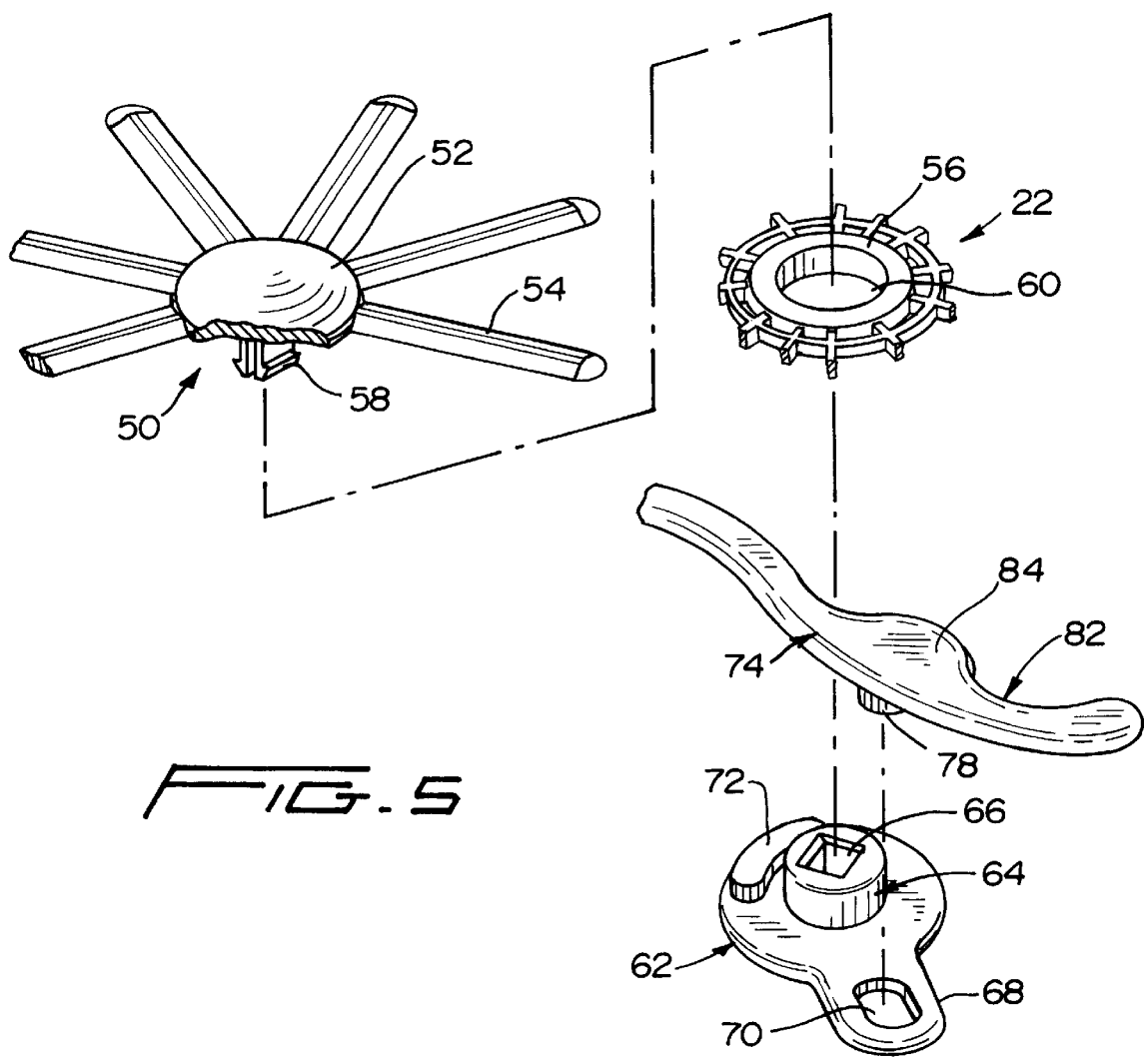
FIG. 5 is an exploded perspective detail view of various of the operating components illustrating the assembly relationship thereof relative to the bottom screen.

The rotor hub overlies the axial central portion of the bottom 22 and an inner annulus thereof defined by a central rigidifying ring 56. In order to achieve a driving relationship of the rotor 50 with the remaining operating components, the rotor includes a split rectangular lug 58 integral with the hub 52 and depending axially therefrom through the central opening 60 in the sifter bottom 22 defined by the inner ring 56. The lug 58, as will be best seen in FIG. 5, includes parallel legs which are provided with snap-locking lower end portions adapted to engage with a corresponding socket in a known manner.

A crank wheel 62 is positioned immediately below the sifter bottom 22 coaxially therewith. The crank wheel 62 includes a central upwardly projecting cylindrical crank hub 64 with a smooth peripheral surface and a central upwardly opening rectangular socket 66. This socket 66 receives the rotor lug 58 and, noting FIGS. 2 and 3, includes internal shoulders to which the locking split ends of the lug engage for a snap-locking of the rotor 52 the crank wheel 62. The rectangular configuration of the lug 58 and the socket 66 provides for a direct rotational driving of the rotor in response to a rotational driving of the crank wheel 62.

The crank wheel 62 includes a radially outwardly extending crank arm 68 having an elongate pin slot 70 therein. The crank wheel 62 is completed by an integral arcuate elongate projection 72 adjacent the outer periphery of the wheel remote from the crank arm 68 and of a height approximately one half of that of the crank hub 64 for sliding engagement with the undersurface of the sifter bottom 22, thereby acting in the manner of a spacer between the disc portion of the crank wheel 62 and the sifter bottom for the accommodation of an elongate drive arm 74.

The drive arm 74 is an integral extension of a relatively wider elongate trigger bar or plate 76 which extends from the drive arm 74 to an outer end which is integral with the lower portion of the trigger 32. This trigger bar 76 is slidably received within the channel 30 defined between the handle and container body. The channel 30, noting FIGS. 3 and 4 in particular, opens directly through the side wall of the container body 12 into the underlying chamber 24 to allow for free sliding reciprocation of the trigger bar 76 and integral drive arm 74.

The drive arm 74 is received in overlying relation to the crank wheel 62 and includes a depending pivot pin 78 which is rotatably received within the elongate crank arm slot 70 whereby reciprocal movement of the drive arm 74, through manipulation of the trigger 32, will effect a corresponding rotation of the crank wheel 62 and the bladed rotor 50 therewith. The crank wheel 62, supported by the rotor 50, effectively supports the drive arm 74 with the space between the crank wheel disc and the overlying sifter bottom 22, defined by the spacer or projection 72, accommodating the desired sliding movement of the drive arm 74. As suggested in FIGS. 6 and 7, the projection 72, or more particularly the opposite ends thereof, can be used as abutments defining the extreme positions of the drive arm 74. As a further means for defining the relaxed position of the trigger 32, an abutment tab 80 can be integrally formed on the trigger bar 76 for engagement against the outer surface of the container body 12, note for example FIGS. 1 and 2.

Turning now more specifically to the drive arm 74, it is particularly significant, in achieving the desired smooth and consistent operation of the sifter, that the relationship between the drive arm 74 and the crank wheel 62, and hence also the rotor 50, be such as to provide a smooth and consistent transfer of driving force therebetween throughout the full range of trigger movement and without requiring the use of excess manual pressure or excess return spring pressure. This is achieved by specifically defining the longitudinal inner edge 82 of the drive arm 74 as a cam edge. The cam edge 82 engages the crank wheel hub 64, which acts as a cam follower, and is lightly biased against the peripheral surface thereof by the inherent flexible resiliency of the drive arm 74, throughout the range of longitudinal movement of the arm 74. This cam surface or edge 82 has an effective length along the arm 74, that is that length which is in edge engagement with the hub 64 throughout the full range of longitudinal reciprocation of the arm 74. In order to achieve the desired smooth operation which allows for use of a constant manual pressure to pull the trigger and a resultant constant spring action to return the trigger, the cam edge 82 is, centrally between the extremes of the effective length thereof, provided with a central lobe 84 with gradually tapering sides. This lobe 84 is configured to maintain constant contact with the outer peripheral surface of the hub 64 as the drive arm 74 is reciprocated through the central length of its movement and will effect a steadily increasing, laterally outward deflected, positioning of the arm 74 as the arm moves and rotates the crank wheel throughout the critical central zone of movement, thereby accommodating what would normally be an increased resistance to or hesitation in the movement. The avoidance of this hesitation is achieved by the steadily increasing torque resulting from the lateral outward shifting of the driver arm 74 relative to the axis of the crank wheel 62. The arm, through the lobe 84, moves laterally outward relative to the crank wheel as the center zone is approached in both the retracting and extending movement of the drive arm 74. As the apex of the central lobe 84 is brought into engagement with the peripheral surface of the crank hub 64, the slot-confined drive arm pin 78 is at its maximum lateral distance from the hub 64 and central axis of the crank wheel 62. As such, maximum torque, for the transmission of force between the arm 74 and wheel 62 is achieved. This in turn allows for passage of the arm and movement of the crank wheel with minimum effort both on the part of the user of the device in manually actuating the trigger, and by the return spring in the return reciprocation of the trigger and drive arm.

The use of the cam edge, and the smoothness of operation thereof, substantially reduces operating stresses on the drive arm. The lateral flexing of the substantially rigid drive arm, effectively controlled by the cam edge, allows for smooth movement of the drive arm pin 74 within the crank arm slot 70 to enhance the unrestricted operation sought, particularly in those situations wherein the trigger will be manipulated repeatedly. Similarly, the enhanced efficiency of the operating relationship between the drive arm 74 and the crank wheel 62 allows for the use of a lighter or weaker return spring 46. This is also essential for effective use of the sifter in that the manual pressure to overcome the resistance of the spring is reduced, allowing for a smoother and more effortless trigger manipulation. All of these factors significantly contribute to a desirable, efficient and practical kitchen implement.

Referring again to FIGS. 1 and 2, and the possibility of storing the sifter 10 with foodstuff remaining therein, the top seal 20 includes an internal depending flange 90 which is received within the open upwardly directed mouth of the container body 12 and frictionally and releasably retained by engagement with a slight inwardly directed lip on the mouth edge or rim 18. This relationship will be best noted in FIG. 2.

The seal 20 is also configured with a central upwardly projecting cylindrical dome 92 with an upwardly directed concave top panel 94. This dome 92 has a peripheral wall 96 which is adapted for telescopic frictional reception and engagement within the lower portion of the wall of the body 12 which defines the chamber 24 for the drive arm and crank wheel components below the bottom screen 22. When so assembled, again referring to FIG. 2, it would be appreciated that the depending flange 90 provides an effective wide stable base while the lower end of the sifter body is sealed against any unwanted discharge through the sifter screen. As suggested in FIGS. 1 and 2, the assembly can actually include two seals 20 for a complete closure of the container body. Alternatively, a single seal can be provided for selective use in closing the top of the container, as for example in sifting particularly fine or powdery materials, or to close the bottom of the container to temporarily halt the discharge.

It is intended that all of the components of the sifter of the invention be formed of appropriate food-compatible synthetic resinous materials, in each instance incorporating the degree of rigidity and resilient flexibility required for the desired movement. In this regard, note, as an example, FIG. 3 wherein the trigger bar 76, while possessing sufficient rigidity as to longitudinally transfer forceable movement of the trigger 32, is capable of a slight degree of lateral flexing to accommodate the inherent upward inclination of the trigger-engaged end thereof. A similar relationship exists between the force transmitting rigidity of the drive arm 74 and the lateral flexible resiliency required to accommodate the desired smooth lateral movement and corresponding torque increase and subsequent decrease.

The foregoing is illustrative of the features of the invention, and in particular the novel concept of enhancing the effective operation of a manual sifter by varying the torque as a means for reducing the effort required in achieving smooth operation. While a single embodiment illustrating the features of the invention has been presented, it is to be appreciated that other embodiments, as they fall within the scope of the claims following hereinafter, are also to be considered within the scope of the invention.

We claim:

1. A sifter for pulverulent foodstuff, comprising:

a container having upper and lower ends and an interior for receiving said foodstuff;

a sifter screen mounted to said lower end of said container in communication with said interior;

an agitator mounted within said interior in close proximity to said sifter screen and for relative movement thereto, said agitator including a central hub with a peripheral surface and a crank arm extending radially outward from said hub, said crank arm including an elongated slot therein; and a drive arm mounted to, and for substantially reciprocating movement between first and second positions with respect to, said container, said drive arm including a pin received within said slot and further including a cam edge engaged with said peripheral surface of said hub, said cam edge causing relative sliding of said pin within said slot during said movement of said drive arm between said first and second positions.

2. A sifter as in claim 1, wherein said hub extends through said sifter screen, said crank arm is located outside of said interior, and said drive arm is mounted intermediate said crank arm and said sifter screen.

3. A sifter as in claim 1, wherein said cam edge includes a lobe extending toward said hub at a position substantially corresponding to a midpoint between said first and second positions.

4. A sifter as in claim 3, wherein said crank arm further includes two abutments, each positioned to contact said drive arm at said first and second positions, respectively, to thus prevent further movement of said drive arm.

5. A sifter as in claim 1, further including a manually engageable handle mounted to said container outside of said interior, and a trigger mounted to said container for oscillating movement about an axis substantially perpendicular to said drive arm, said drive arm being mounted to said trigger at a position spaced from said axis.

6. A sifter as in claim 5, wherein said trigger is resiliently biased to move said drive arm to one of said first and second positions.

7. A sifter as in claim 5, wherein said trigger is mounted to said container via mounting to said handle, and wherein said trigger is resiliently biased to move said drive arm to one of said first and second positions.

* * * * *